(12) United States Patent
Bassett

(10) Patent No.: US 7,673,570 B1
(45) Date of Patent: Mar. 9, 2010

(54) ROW-CLEARING UNIT FOR AGRICULTURAL IMPLEMENT

(75) Inventor: Joseph D. Bassett, DeKalb, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 12/325,723

(22) Filed: Dec. 1, 2008

(51) Int. Cl.
*A01B 19/00* (2006.01)
*A01B 21/02* (2006.01)
*A01B 49/04* (2006.01)
*A01C 5/00* (2006.01)
*A01C 7/18* (2006.01)

(52) U.S. Cl. .................... 111/63; 111/66; 111/140; 111/143; 111/167; 172/551; 172/624.5; 172/705

(58) Field of Classification Search ............... 111/143, 111/139, 140, 14, 157, 163, 167, 168, 52, 111/59, 62, 63, 65, 66; 172/551, 624.5, 705
See application file for complete search history.

(56) References Cited

U.S. PATENT DOCUMENTS

| | | | |
|---|---|---|---|
| 5,136,934 A | * | 8/1992 | Darby, Jr. ............... 100/125 |
| 5,461,995 A | * | 10/1995 | Winterton ............... 111/139 |
| 5,479,992 A | | 1/1996 | Bassett |
| 5,499,683 A | | 3/1996 | Bassett |
| 5,709,271 A | | 1/1998 | Bassett |
| 6,253,692 B1 | | 7/2001 | Wendling et al. |
| 6,460,623 B1 | | 10/2002 | Knussman et al. |

* cited by examiner

*Primary Examiner*—Christopher J. Novosad
(74) *Attorney, Agent, or Firm*—Nixon Peabody LLP

(57) ABSTRACT

An agricultural row-clearing unit for use with an agricultural row unit attached to a towing frame hitched to a tractor comprises an attachment frame adapted to be rigidly connected to the towing frame, a support element having a leading end pivotally connected to the attachment frame for vertical pivoting movement relative to the attachment frame, at least one agricultural tool mounted on the trailing end of the support element, and a hydraulic cylinder connected between the attachment frame and the support element for pivoting the support element around the pivotal connection to the attachment frame. The hydraulic cylinder includes a movable rod coupling the cylinder to the support element, a cavity within the cylinder for receiving pressurized hydraulic fluid for advancing the rod in a direction that pivots the support element downwardly toward the soil, and an energy storage device coupled to the rod and the cylinder to apply a retracting force to the rod to bias the support element in a direction that urges the agricultural tool(s) upwardly away from the soil.

10 Claims, 8 Drawing Sheets

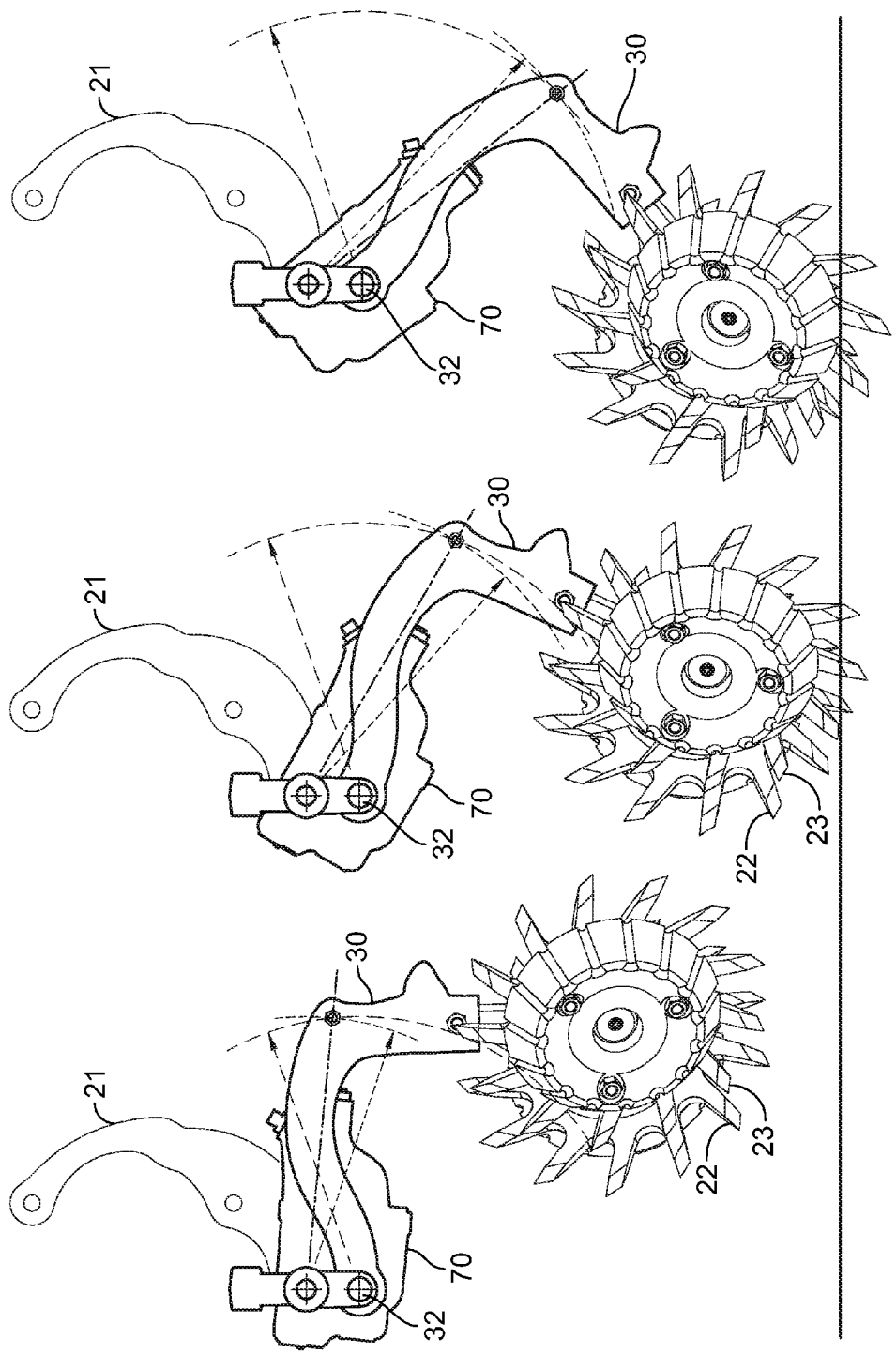

ROW-CLEARING UNIT FOR AGRICULTURAL IMPLEMENT

FIELD OF THE INVENTION

The present invention relates to agricultural implements and, more particularly, to an agricultural row-clearing unit for use with agricultural implements such as planting row units.

SUMMARY OF THE INVENTION

In one embodiment, an agricultural row clearing unit for use with an agricultural planter row unit attached to a towing frame hitched to a tractor comprises an attachment frame adapted to be rigidly connected to the towing frame, a support element having a leading end pivotally connected to the attachment frame for vertical pivoting movement relative to the attachment frame, at least one agricultural tool mounted on the trailing end of the support element, and a hydraulic cylinder connected between the attachment frame and the support element for pivoting the support element around the pivotal connection to the attachment frame. The hydraulic cylinder includes a movable rod coupling the cylinder to the support element, a cavity within the cylinder for receiving pressurized hydraulic fluid for advancing the rod in a direction that pivots the support element downwardly, and an energy storage device coupled to the rod and the cylinder to apply a retracting force to the rod to bias the support element in a direction that urges the agricultural tool(s) upwardly away from the soil.

One implementation also includes an accumulator having a fluid chamber containing a diaphragm. The portion of the chamber on one side of the diaphragm is connected to the hydraulic-fluid cavity in said hydraulic cylinder, and the portion of the chamber on the other side of the diaphragm contains a pressurized gas.

In one particular implementation, the energy storage device is a compressed coil spring disposed around a portion of the movable rod with one end of the spring coupled to said rod and the other end of the spring coupled to the cylinder so that the spring continuously biases the movable rod in a retracting direction relative to the cylinder.

In modified embodiments, the row-clearing wheels may be replaced with other agricultural tools, such as fertilizer openers or rollers to firm loose soil. With the row-clearing wheels or any other agricultural tools, the unit may be used without a planting row unit, or any other row unit, and the frame element may be connected directly to the towing frame.

BRIEF DESCRIPTION OF THE DRAWINGS

The invention may best be understood by reference to the following description taken in conjunction with the accompanying drawings, in which:

FIGS. 4, 5 and 6 are side elevations of the main components of the row-clearing unit shown in FIGS. 1-3 in three different vertical positions.

DETAILED DESCRIPTION OF ILLUSTRATED EMBODIMENTS

Figure 1:
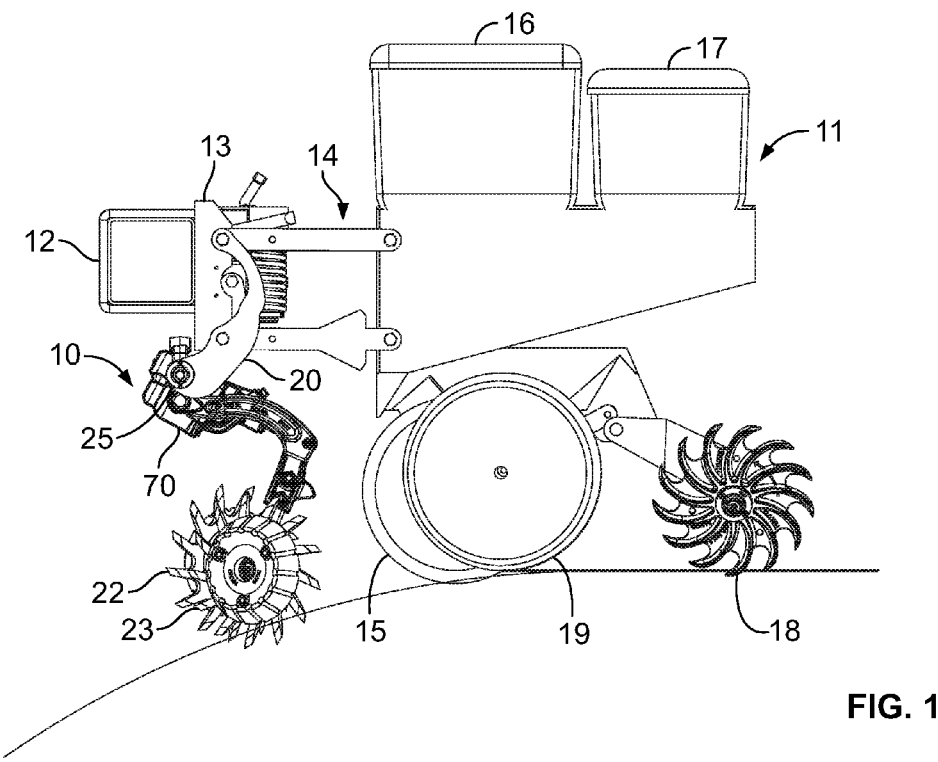
FIG. 1 is a side elevation of a planting row unit and a row-clearing unit, both attached to a towing frame, with the row-clearing unit in a lowered position.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings, the illustrative implement includes a row-clearing unit 10 mounted in front of a planting row unit 11. A common elongated hollow towing frame 12 (typically hitched to a tractor by a draw bar) is rigidly attached to the front frame 13 of a four-bar linkage assembly 14 that is part of the row unit 11. The four-bar (sometimes referred to as "parallel-bar") linkage assembly 14 is a conventional and well known linkage used in agricultural implements to permit the raising and lowering of tools attached thereto.

As the planting row unit 11 is advanced by the tractor, a coulter wheel 15 works the soil and then other portions of the row unit part the cleared soil to form a seed slot, deposit seed in the seed slot and fertilizer adjacent to the seed slot, and close the seed slot by distributing loosened soil into the seed slot with a closing wheel 18. A gauge wheel 19 determines the planting depth for the seed and the height of introduction of fertilizer, etc. Bins 16 and 17 on the row unit carry the chemicals and seed which are directed into the soil. The planting row unit 11 is urged downwardly against the soil by its own weight. If it is desired to have the ability to increase this downward force, or to be able to adjust the force, a hydraulic or pneumatic cylinder and/or one or more springs may be added between the front frame 13 and the linkage 14 to urge the row unit downwardly with a controllable force. Such a hydraulic cylinder may also be used to lift the row unit off the ground for transport by a heavier, stronger, fixed-height frame that is also used to transport large quantities of fertilizer for application via multiple residue-clearing and tillage row units. This hydraulic or pneumatic cylinder may be controlled to adjust the downward force for different soil conditions such as is described in U.S. Pat. Nos. 5,709,271, 5,685,245 and 5,479,992.

The row-clearing unit 10 includes an attachment frame that includes a pair of rigid arms 20 and 21 adapted to be rigidly connected to the towing frame 12. In the illustrative embodiment, the arms 20 and 21 are bolted to opposite sides of the front frame 13 of the row unit 11, which in turn is rigidly attached to the towing frame 12. An alternative is to attach the row-clearing unit 10 directly to the towing frame 12. At the bottom of the row-clearing unit 10, a pair of cooperating toothed clearing wheels 22 and 23 are positioned upstream of the coulter wheel 15 of the planting row unit 11.

The clearing wheels 22, 23 are arranged for rotation about transverse axes and are driven by the underlying soil as the wheels are advanced over the soil. The illustrative wheels 22, 23 are a type currently sold by the assignee of the present invention under the trademark TRASHWHEEL. The toothed wheels 22, 23 cooperate to produce a scissors action that breaks up compacted soil and simultaneously clears residue out of the path of planting. The wheels 21 and 22 kick residue off to opposite sides, thus clearing a row for planting. To this end, the lower edges are tilted outwardly to assist in clearing the row to be planted. This arrangement is particularly well suited for strip tilling, where the strip cleared for planting is typically only about 10 inches of the 30-inch center-to-center spacing between planting rows.

Figure 2:
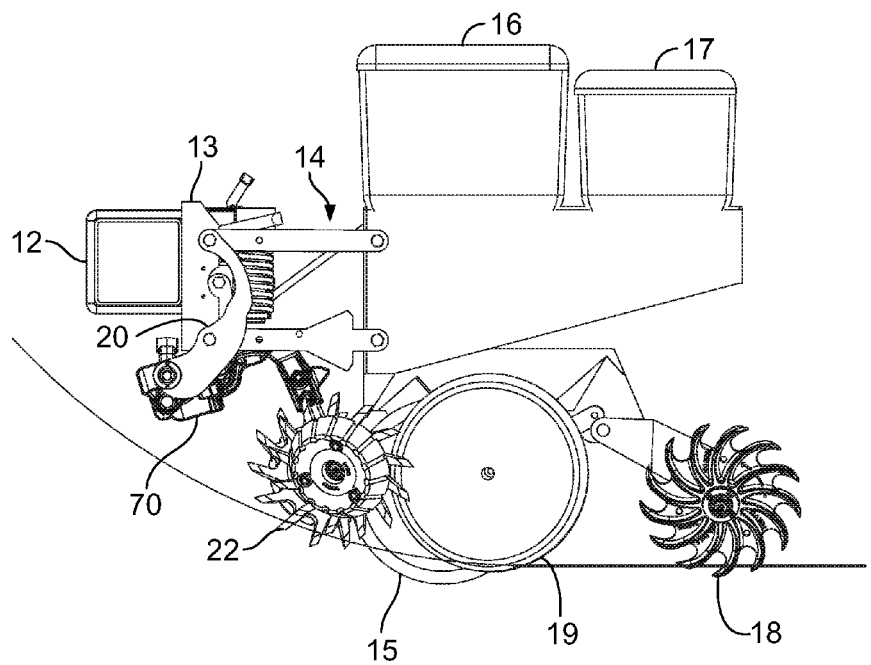
FIG. 2 is the same side elevation shown in FIG. 1 with the row-clearing unit in a raised position.
Figure 3:
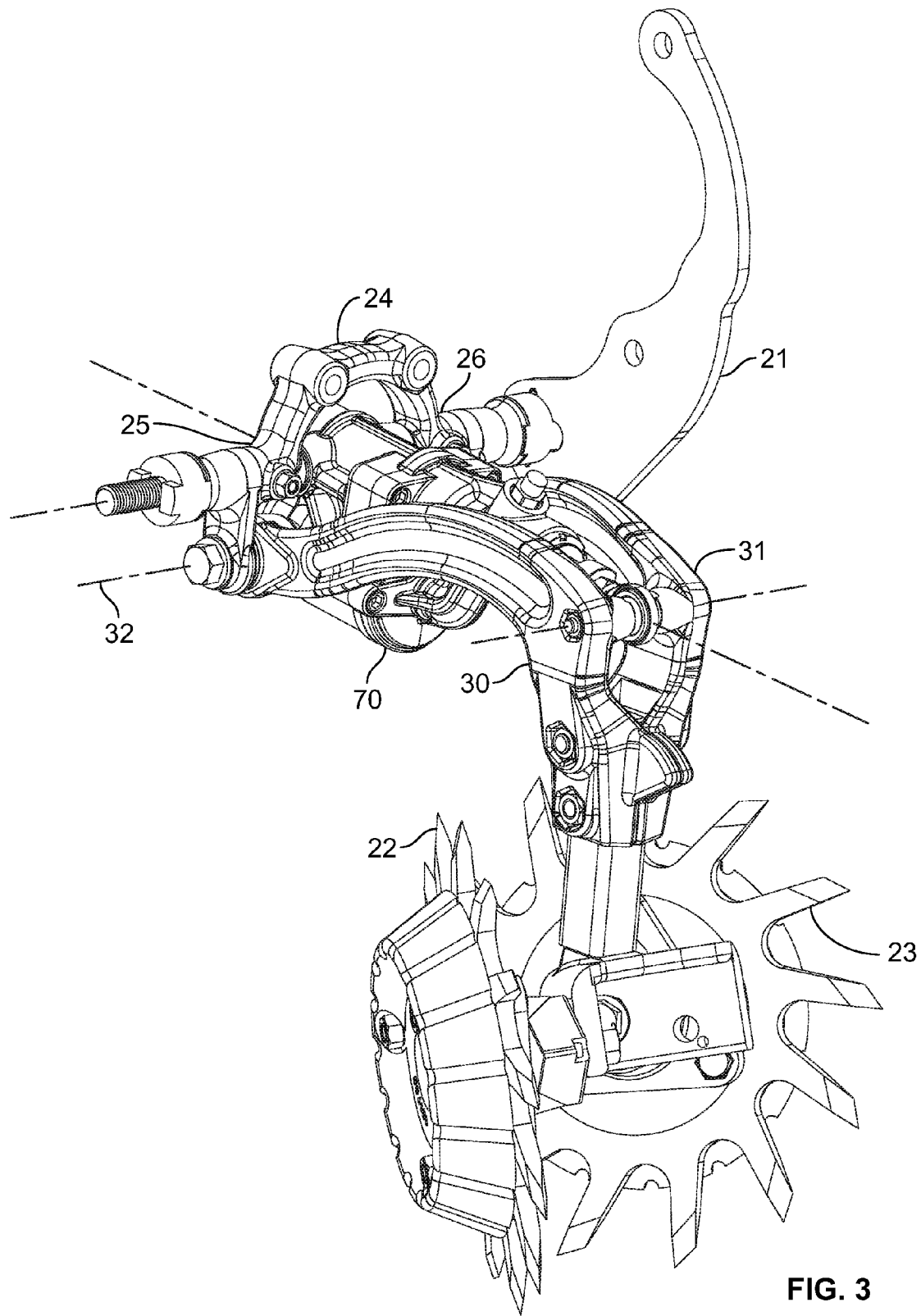
FIG. 3 is an enlarged perspective of the row-clearing unit shown in FIGS. 1 and 2.

In FIGS. 1 and 2, the clearing wheels 22 and 23 are shown in two different vertical positions. Specifically, the wheels 22, 23 are in a lower position in FIG. 1, where the elevation of the soil is decreasing, than in FIG. 2, where the soil elevation is increasing.

The row-clearing unit 10 is shown in more detail in FIGS. 3-9. The two frame arms 20, 21 are interconnected by an arched crossbar 24 that includes a pair of journals 25 and 26 for receiving the leading ends of a pair of laterally spaced support arms 30 and 31. The support arms 30, 31 are thus pivotally suspended from the crossbar 24 of the attachment frame, so that the trailing ends of the support arms 30, 31 can be pivoted in an arc around a horizontal axis 32 extending through the two journals 25, 26.

The row-clearing wheels 22 and 23 are mounted on the trailing ends of the support arms 30 and 31, which are bolted or welded together. As can be seen in FIGS. 4-6, the wheels 22, 23 can be raised and lowered by pivoting the support arms 30, 31 around the horizontal axis 32. The pivoting movement of the support arms 30, 31 is controlled by a hydraulic cylinder 70 connected between the fixed crossbar 24 and the trailing ends of the support arms 30, 31. FIGS. 4-6 show the support arms 30, 31, and thus the clearing wheels 22, 23, in progressively lower positions. The downward pressure applied to the support arms 30, 31 to urge the clearing wheels 22, 23 against the soil is also controlled by the hydraulic cylinder 70.

Figure 7:
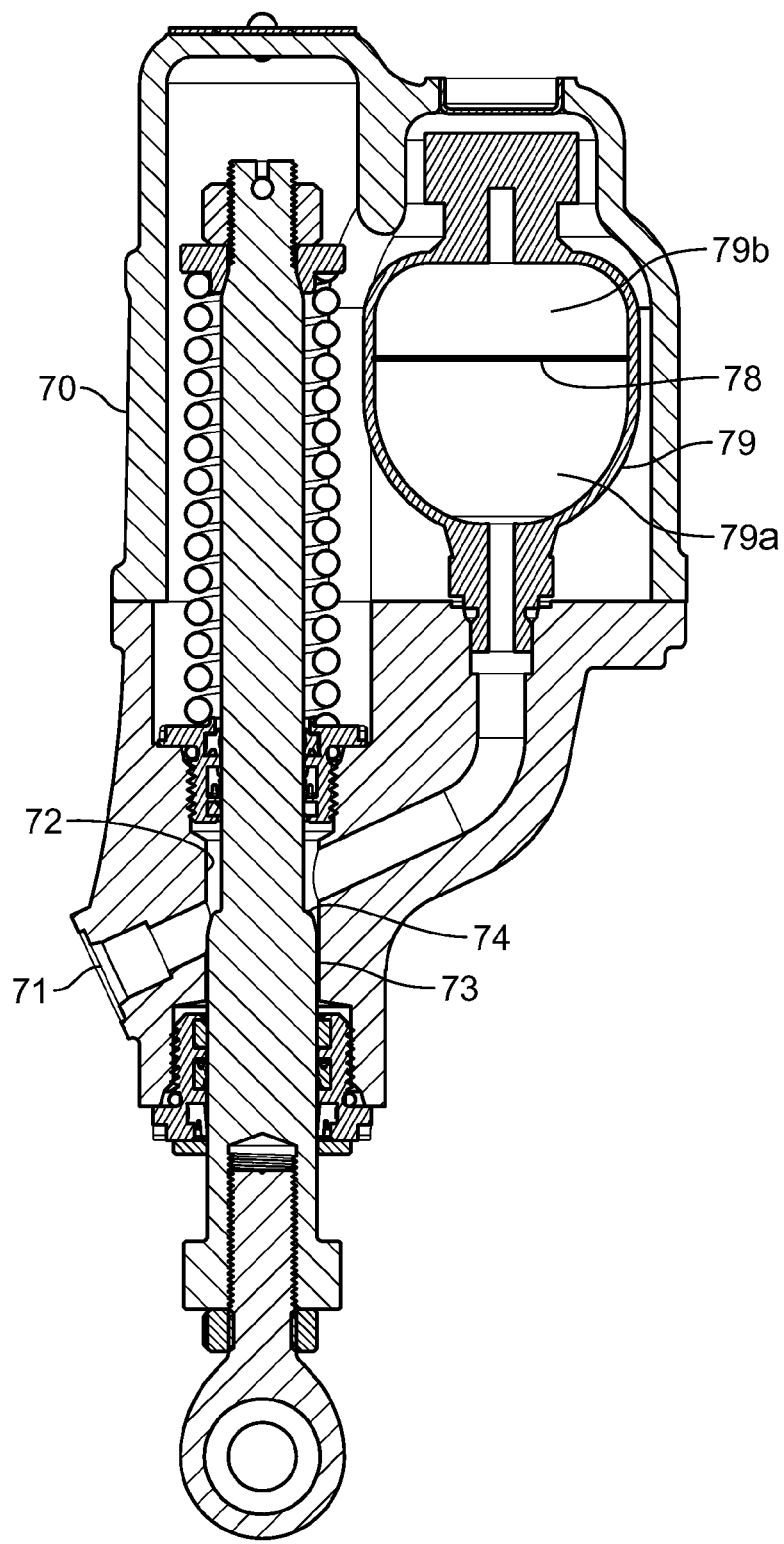
FIGS. 7, 8 and 9 are side elevations of the hydraulic cylinder of the row-clearing unit shown in FIGS. 1-6 with the cylinder rod in three different positions corresponding to the positions shown in FIGS. 5, 6 and 4, respectively.
Figure 8:
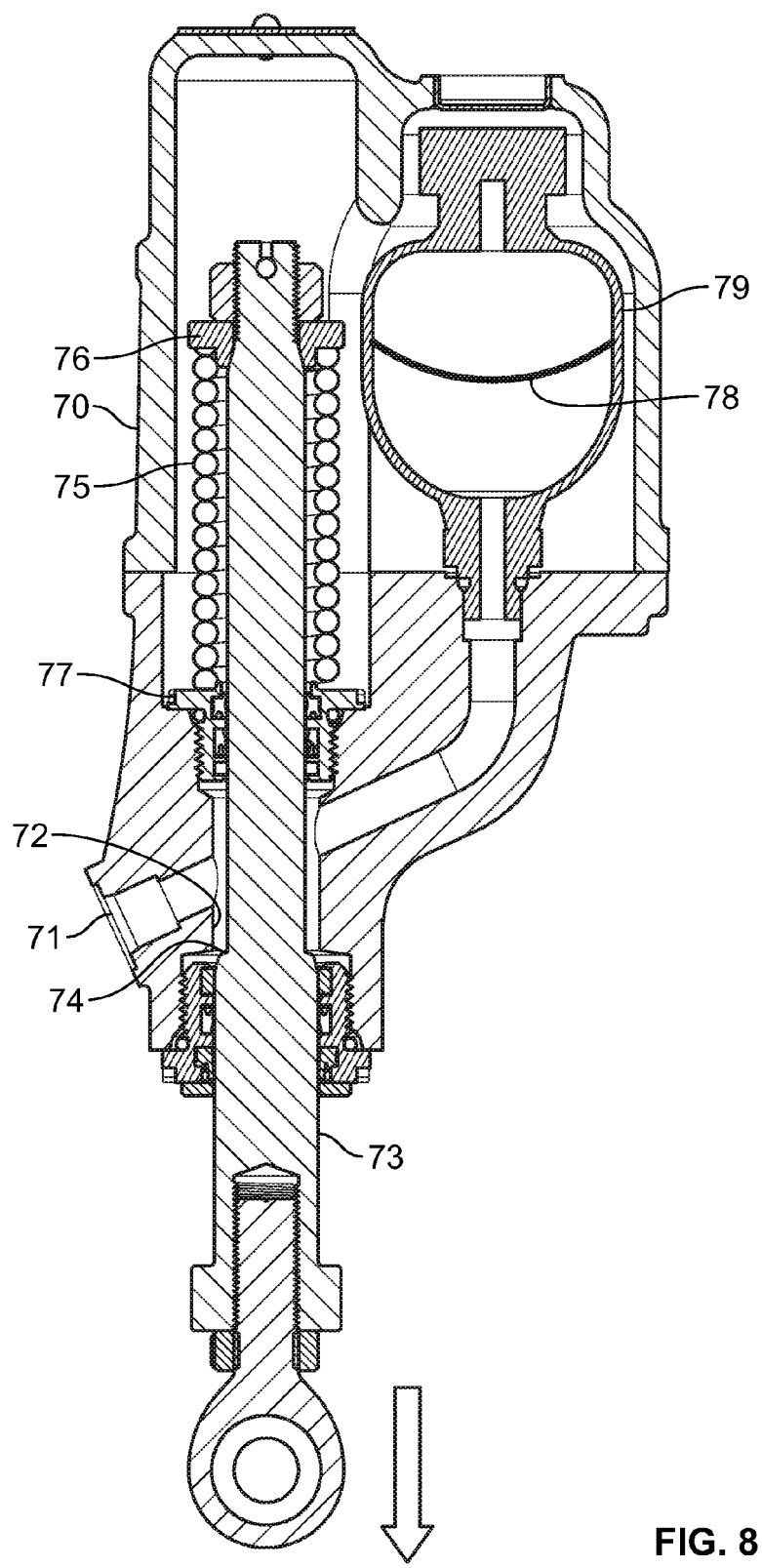
Figure 9:
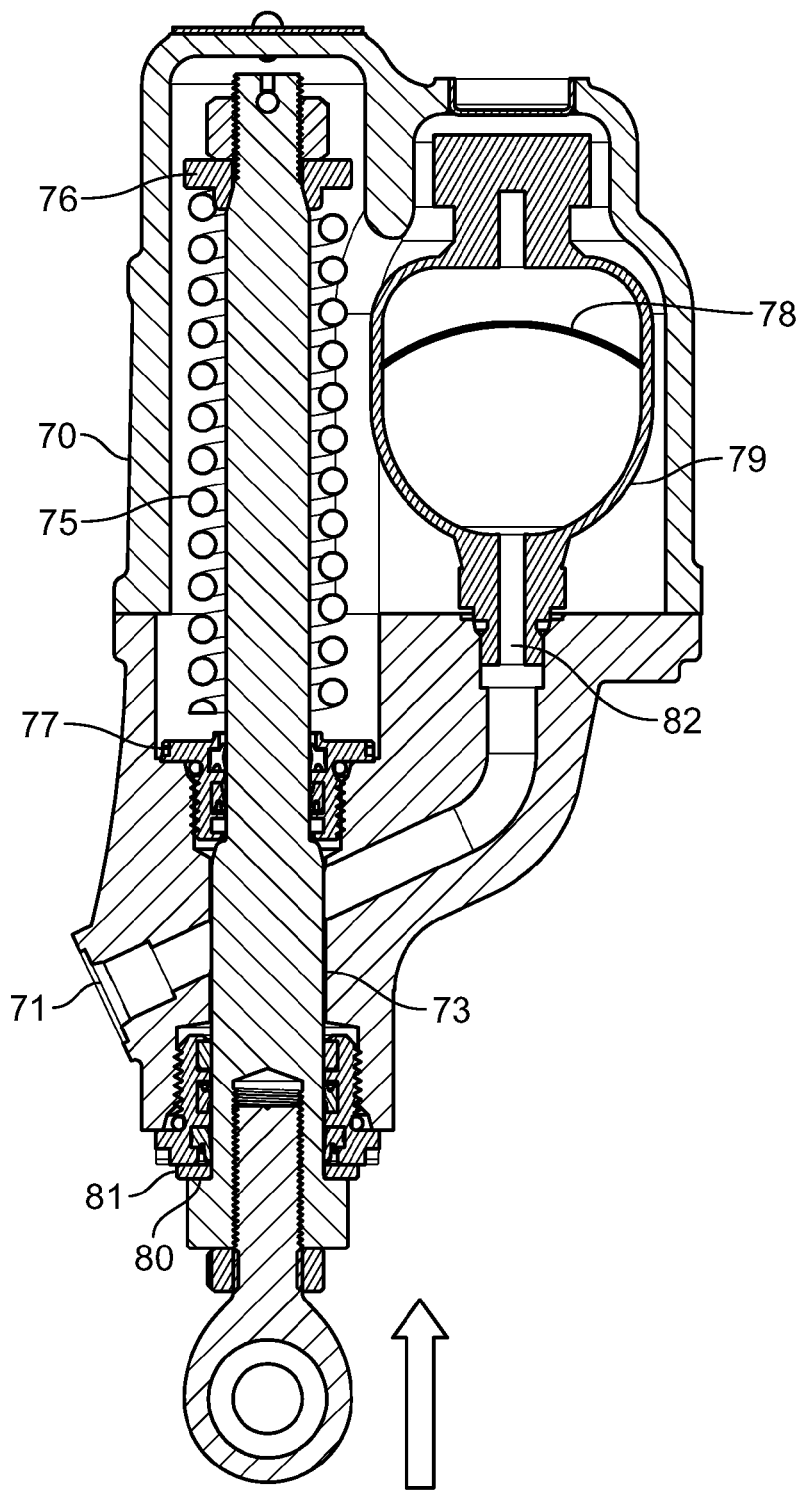

The hydraulic cylinder 70 is shown in more detail in FIGS. 7-9. Pressurized hydraulic fluid from the tractor is supplied by a hose (not shown) to a port 71 that leads into an annular cavity 72 surrounding a rod 73, and then on into an accumulator 79. After the internal cavities connected to the port 71 are filled with pressurized hydraulic fluid, the port is closed by a valve, as will be described in more detail below. The lower end of the annular cavity 72 is formed by a shoulder 74 on the rod 73, so that the hydraulic pressure exerted by the hydraulic fluid on the surface of the shoulder 74 urges the rod 73 downwardly (as viewed in FIGS. 7-9), with a force determined by the pressure of the hydraulic fluid and the area of the exposed surface of the shoulder 74. The hydraulic fluid thus urges the rod 73 in an advancing direction (see FIG. 8).

When the rod 73 is advanced outwardly from the cylinder 70, the rod pivots the support arms 30, 31 downwardly, thereby lowering the clearing wheels 22, 23. Conversely, retracting movement of the rod 73 pivots the support arms 30, 31 upwardly, thereby raising the clearing wheels 22, 23.

The accumulator 79 includes a diaphragm that divides the interior of the accumulator into a hydraulic-fluid chamber 79a and a gas-filled chamber 79b, e.g., filled with pressurized nitrogen. FIG. 7 shows the rod 73 in a position where the diaphragm is not deflected in either direction, indicating that the pressures exerted on opposite sides of the diaphragm are substantially equal. In FIG. 8, the hydraulic force has advanced the rod 73 to its most advanced position, which occurs when the resistance offered by the soil to downward movement of the clearing wheels 22, 23 is reduced (e.g., by softer soil or a depression in the soil).

As can be seen in FIG. 8, advancing movement of the rod 73 is limited by the "bottoming out" of a coil spring 75 located between a flange 76 attached to the inner end of the rod 73 and a flange 77 attached to the interior of the cylinder 70. As the rod 73 is advanced, the coil spring 75 is progressively compressed until it reaches its fully compressed condition illustrated in FIG. 8, which prevents any further advancement of the rod 73. Advancing movement of the rod 73 also expands the size of the annular cavity 72 (see FIG. 8), which causes the diaphragm 78 in the accumulator 79 to deflect to the position illustrated in FIG. 8 and reduce the amount of hydraulic fluid in the accumulator 80. When the rod 73 is in this advanced position, the support arms 30, 31 and the clearing wheels 22, 23 are pivoted to their lowermost positions relative to the row unit 11.

In FIG. 9, the rod 73 has been withdrawn to its most retracted position, which can occur when the clearing wheels 22, 23 encounter a rock or other obstruction, for example. When the rod 73 is in this retracted position, the support arms 30, 31 and the clearing wheels 22, 23 are pivoted to their uppermost positions relative to the row unit. As can be seen in FIG. 9, retracting movement of the rod 73 is limited by engagement of a shoulder 80 on the rod 73 with a ring 81 on the trailing end of the cylinder 70. As the rod 73 is retracted by forces exerted on the clearing wheels 22, 23, the coil spring 75 is progressively expanded, as illustrated in FIG. 9, but still applies a retracting bias to the rod 73.

Retracting movement of the rod 73 virtually eliminates the annular cavity 72 (see FIG. 9), which causes a portion of the fixed volume of hydraulic fluid in the cylinder 70 to flow into the chamber 79a of the accumulator 79, causing the diaphragm 78 to deflect to the position illustrated in FIG. 9. This deflection of the diaphragm 78 into the chamber 79b compresses the gas in that chamber. To enter the chamber 79a, the hydraulic fluid must flow through a restriction 82, which limits the rate at which the hydraulic fluid flows into the accumulator. This controlled rate of flow of the hydraulic fluid has a damping effect on the rate at which the rod 73 retracts or advances, thereby avoiding sudden large movements of the moving parts of the row-clearing unit.

When the external obstruction causing the row cleaners to rise is removed from the clearing wheels, the combined effects of the pressurized gas in the accumulator 79 on the diaphragm 78 and the pressure of the hydraulic fluid move the rod 73 to a more advanced position. This downward force on the clearing wheels 22, 23 holds them against the soil and prevents uncontrolled bouncing of the wheels over irregular terrain, but is not so excessive as to leave a trench in the soil. The downward force applied to the clearing wheels 22, 23 can be adjusted by changing the pressure of the hydraulic fluid supplied to the cylinder 70.

Figure 10:
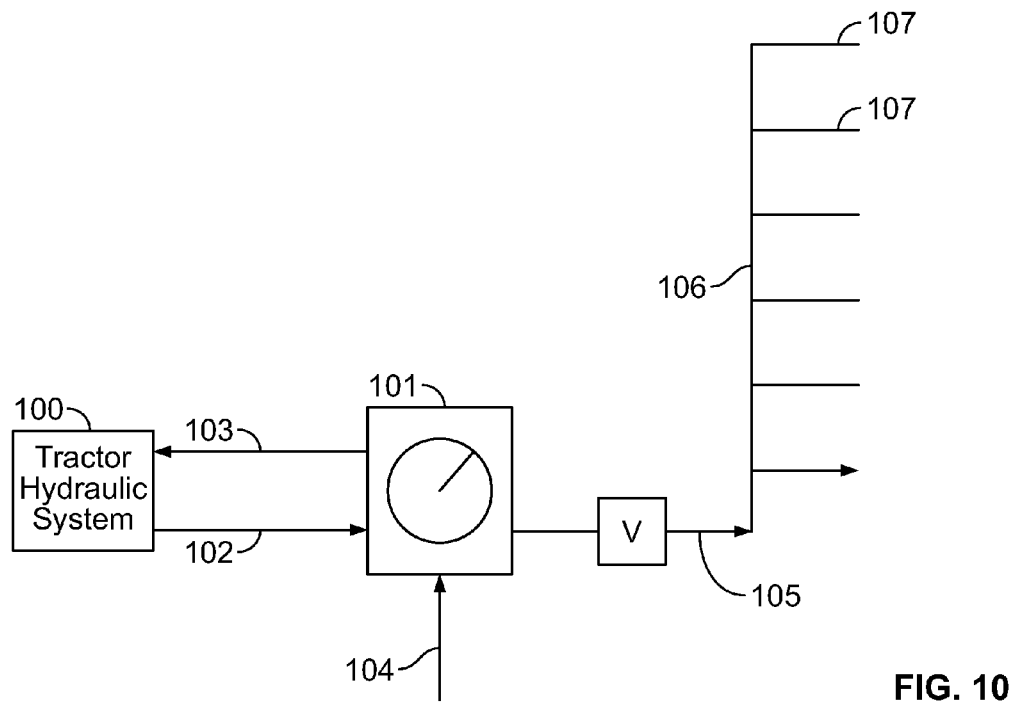
FIG. 10 is a schematic diagram of a first hydraulic control system for use in the row-clearing unit shown in FIGS. 1-6.

FIG. 10 is a schematic of a hydraulic control system for supplying pressurized hydraulic fluid to the cylinders 70 of multiple row-clearing units. A source 100 of pressurized hydraulic fluid, typically located on a tractor, supplies hydraulic fluid under pressure to a valve 101 via supply line 102 and receives returned fluid through a return line 103. The valve 101 can be set by an electrical control signal S1 on line 104 to deliver hydraulic fluid to an output line 105 at a desired constant pressure. The output line is connected to a manifold 106 that in turn delivers the pressurized hydraulic fluid to individual feed lines 107 connected to the ports 71 of the respective hydraulic cylinders 70 of the individual row-clearing units. With this control system, the valve 101 is turned off, preferably by a manually controlled on/off valve V, after all the cylinders 70 have been filled with pressurized hydraulic fluid, to maintain a fixed volume of fluid in each cylinder.

Figure 11:
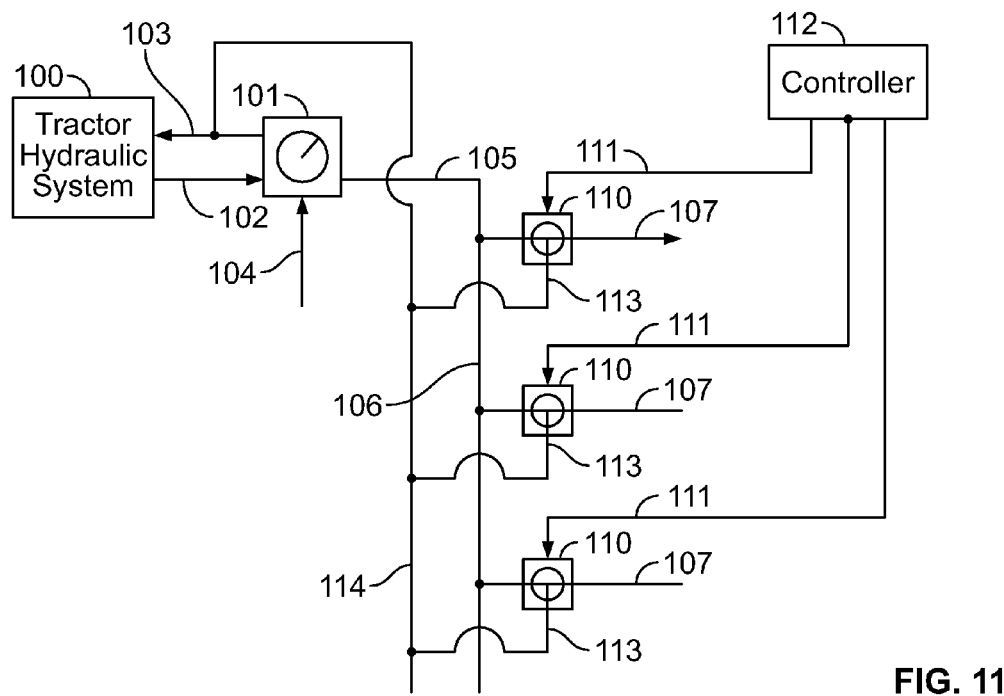
FIG. 11 is a schematic diagram of a second hydraulic control system for use in the row-clearing unit shown in FIGS. 1-6.

FIG. 11 is a schematic of a modified hydraulic control system that permits individual control of the supply of hydraulic fluid to the cylinder 70 each separate row-clearing unit via feed lines 107 connected to the ports 71 of the respective cylinders 70. Portions of this system that are common to those of the system of FIG. 10 are identified by the same reference numbers. The difference in this system is that each separate feed line 107 leading to one of the row-clearing units is provided with a separate control valve 110 that receives its own separate control signal on a line 111 from a controller 112. This arrangement permits the supply of pressurized hydraulic fluid to each row-clearing unit to be turned off and on at different times by the separate valve 110 for each unit, with the times being controlled by the separate control signals supplied to the valves 110 by the controller 112. The individual valves 110 receive pressurized hydraulic fluid via the manifold 106, and return hydraulic fluid to a sump on the tractor via separate return line 113 connected to a return manifold 114 connected back to the hydraulic system 100 of the tractor.

Figure 12:
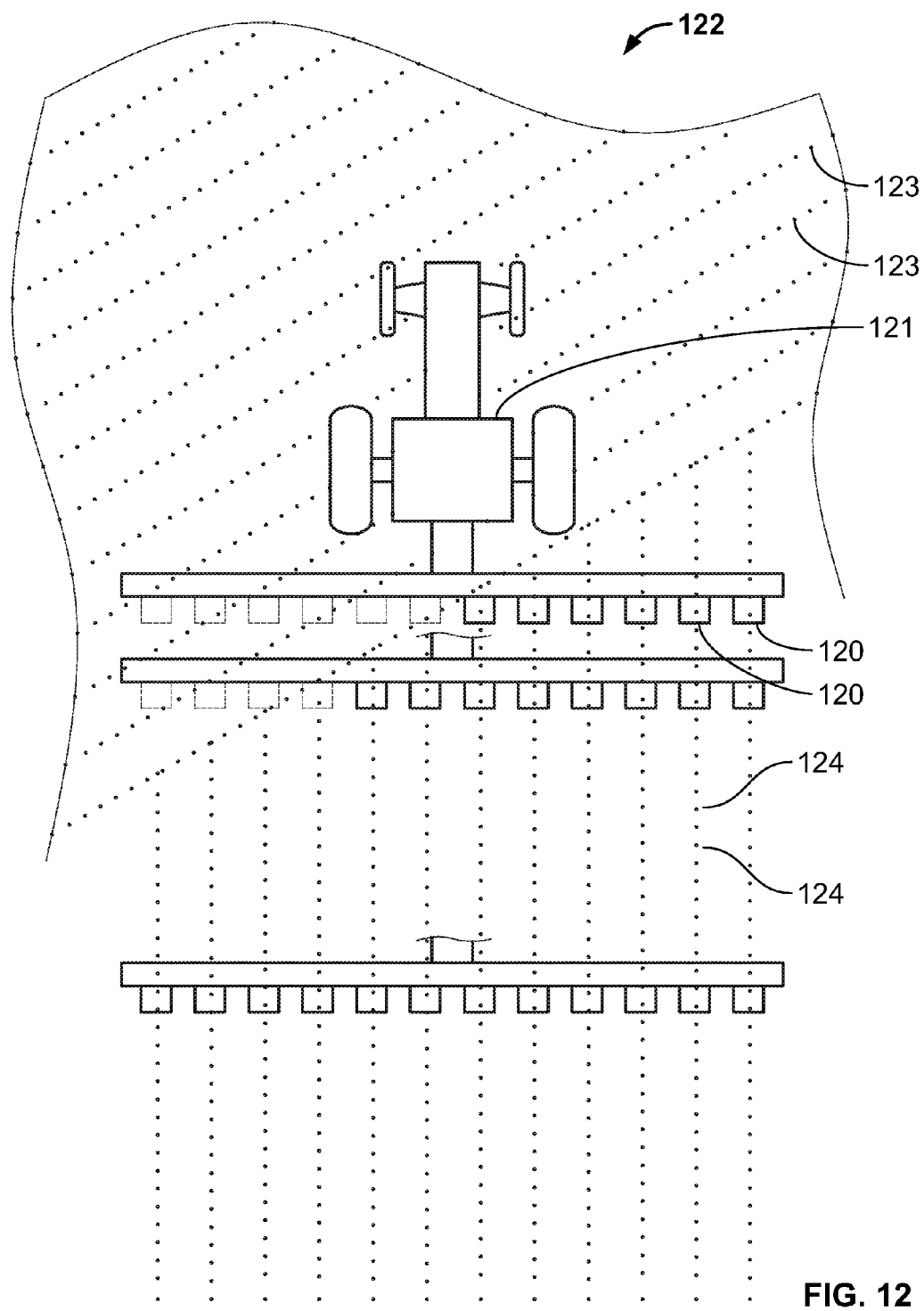
FIG. 12 is a diagram illustrating one application of the hydraulic control system of FIG. 11.

FIG. 12 illustrates on application for the controllable hydraulic control system of FIG. 11. Modern agricultural equipment often includes GPS systems that enable the user to know precisely where a tractor is located in real time. Thus, when a gang of planting row units 120 towed by a tractor 121 begins to cross a headland 122 in which the rows 123 are not orthogonal to the main rows 124 of a field, each planting row unit 120 can be turned off just as it enters the headland 122, to avoid double-planting while the tractor 121 makes a turn through the headland. With the control system of FIG. 11, the hydraulic cylinder 70 of each row unit can also be separately controlled to turn off the supply of pressurized hydraulic fluid at a different time for each row-clearing unit, so that each row-clearing unit is raised just as it enters the headland, to avoid disrupting the rows already planted in the headland.

One benefit of the system of FIG. 11 is that as agricultural planters, seeders, fertilizer applicators, tillage equipment and the like become wider with more row units on each frame, often 36 30-inch rows or 54 20-inch rows on a single 90-foot wide toolbar, is that each row-clearing unit can float vertically independently of every other row-clearing unit. Yet the following row units still have the down force remotely adjustable from the cab of the tractor or other selected location. This permits very efficient operation of a wide planter or other agricultural machine in varying terrain without having to stop to make manual adjustment to a large number of row-clearing units, resulting in a reduction in the number of acres planted in a given time period. One of the most important factors in obtaining a maximum crop yield is timely planting. By permitting remote down force adjustment of each row-clearing unit (or group of units), including the ability to quickly release all down force and let the row cleaner quickly rise, e.g., when approaching a wet spot in the field, one can significantly increase the planter productivity or acres planted per day, thereby improving yields and reducing costs of production.

On wide planters or other equipment, at times 90 feet wide or more and planting at 6 mph or more forward speed, one row-clearing unit must often rise or fall quickly to clear a rock or plant into an abrupt soil depression. Any resistance to quick movement results in either gouging of the soil or an uncleared portion of the field and reduced yield. With the row-clearing unit having its own hydraulic accumulator, the clearing wheels and the rod of the hydraulic cylinder can move quickly and with a nearly constant down force. Oil displaced by or required by quick movement of the rod and clearing wheels (or other agricultural tool) is quickly moved into or out of the closely mounted accumulator which is an integral part of each row-clearing unit. The accumulator diaphragm or piston supplies or accepts fluid as required at a relatively constant pressure and down force as selected manually or automatically by the hydraulic control system. By following the soil profile closely and leaving a more uniform surface, the toolbar-frame-mounted row-clearing unit permits the planter row unit following independently behind to use less down force for its function, resulting in more uniform seed depth control and more uniform seedling emergence. More uniform seedling stands usually result in higher yields than less uniform seedling stands produced by planters with less accurate row cleaner ground following.

Although the illustrative embodiments described above utilize clearing wheels as the agricultural tools, it should be understood that the invention is also applicable to row units that utilize other agricultural tools, such as fertilizer openers or rollers for firming loose soil.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural row-clearing unit for use with an agricultural planting row unit attached to a towing frame hitched to a tractor, said row clearing unit comprising:
    an attachment frame adapted to be rigidly connected to said towing frame,
    a support element having a leading end pivotally connected to said attachment frame at a pivotal connection for vertical pivoting movement relative to said attachment frame,
    at least one row-clearing wheel mounted on the trailing end of said support element,
    a hydraulic cylinder pivotally connected between said attachment frame and said support element for pivoting said support element around said pivotal connection to said attachment frame, said hydraulic cylinder including
        a movable rod coupling said cylinder to said support element,
        a cavity within said cylinder for receiving pressurized hydraulic fluid for advancing said rod in a direction that pivots said support element downwardly toward the soil, and
        an energy storage device coupled to said rod and said cylinder to apply a retracting force to said rod to pivotally bias said support element in a direction that urges said at least one row-clearing wheel upwardly away from the soil.

2. The row-clearing unit of claim 1 which includes an accumulator having a fluid chamber containing a diaphragm, the portion of said chamber on one side of said diaphragm connected to said hydraulic-fluid cavity in said hydraulic cylinder, and the portion of said chamber on the other side of said diaphragm containing a pressurized gas.

3. The row-clearing unit of claim 2 in which said cavity is closed so that the volume of hydraulic fluid in said cylinder and accumulator is fixed.

4. The row-clearing unit of claim 1 in which said energy storage device is a compressed coil spring disposed around a portion of said rod with one end of said spring coupled to said rod and the other end of said spring coupled to said cylinder so that said spring continuously biases said movable rod in a retracting direction relative to said cylinder.

5. The row-clearing unit of claim 1 in which said rod forms a shoulder within said cavity so that the pressure of said hydraulic fluid urges said rod in an advancing direction.

6. The row-clearing unit of claim 1 in which said agricultural row unit is a planting row unit.

7. The row-clearing unit of claim 6 which said attachment frame is adapted to be rigidly connected to said towing frame via an attachment frame of a planting row unit.

8. An agricultural implement for use with a towing frame adapted to be hitched to a tractor, said implement comprising
   an attachment frame adapted to be rigidly connected to said towing frame,
   a support element having a leading end pivotally connected to said attachment frame at a pivotal connection for vertical pivoting movement relative to said attachment frame,
   at least one agricultural tool mounted on the trailing end of said support element,
   a hydraulic cylinder pivotally connected between said attachment frame and said support element for pivoting said support element around said pivotal connection to said attachment frame, said hydraulic cylinder including
      a movable rod coupling said cylinder to said support element,
      a cavity within said cylinder for receiving pressurized hydraulic fluid for advancing said rod in a direction that pivots said support element downwardly toward the soil, and
      an energy storage device coupled to said rod and said cylinder to apply a retracting force to said rod to pivotally bias said support element in a direction that urges said at least one agricultural tool upwardly away from the soil.

9. An agricultural implement for use with a towing frame adapted to be hitched to a tractor, said implement comprising
   a planting row unit having
      a frame element rigidly adapted to be rigidly attached to said towing frame, and
      a planting assembly pivotally connected to said frame element, and
   a row-clearing unit having
      a frame element adapted to be rigidly connected to said towing frame,
      a support element having a leading end pivotally connected to said frame element of said row-clearing unit at a pivotal connection for vertical pivoting movement of said support element,
      at least one clearing wheel mounted on the trailing end of said support element,
      a hydraulic cylinder pivotally connected between said frame element of said row-clearing unit and said support element for pivoting said support element around said pivotal connection, said hydraulic cylinder including
         a movable rod coupling said cylinder to said support element,
         a cavity within said cylinder for receiving pressurized hydraulic fluid for advancing said rod in a direction that pivots said support element downwardly, and
         an energy storage device coupled to said rod and said cylinder to apply a retracting force to said rod to pivotally bias said support element in a direction that urges said at least one clearing wheel upwardly away from the soil to be cleared.

10. The agricultural implement of claim 9 in which said frame element of said row-clearing unit is adapted to be rigidly connected to said towing frame via said frame element of said planting row unit.

* * * * *